(12) United States Patent  
Angello

(10) Patent No.: US 11,090,783 B2  
(45) Date of Patent: Aug. 17, 2021

(54) OFFSET TORQUE DRIVE APPARATUS AND SYSTEM

(71) Applicant: Joseph G. Angello, Middlefield, CT (US)

(72) Inventor: Joseph G. Angello, Middlefield, CT (US)

( * ) Notice: Subject to any disclaimer, the term of this patent is extended or adjusted under 35 U.S.C. 154(b) by 0 days.

(21) Appl. No.: 15/231,755

(22) Filed: Aug. 8, 2016

(65) Prior Publication Data

US 2017/0036326 A1 Feb. 9, 2017

Related U.S. Application Data

(60) Provisional application No. 62/202,834, filed on Aug. 8, 2015.

(51) Int. Cl.
| | | |
|---|---|---|
| *B25B 13/48* | (2006.01) | |
| *F16H 57/02* | (2012.01) | |
| *B25B 17/02* | (2006.01) | |
| *F16H 1/06* | (2006.01) | |

(52) U.S. Cl.
CPC .......... *B25B 13/481* (2013.01); *B25B 17/02* (2013.01); *F16H 57/02* (2013.01); *F16H 1/06* (2013.01)

(58) Field of Classification Search
CPC ......... F16H 1/06; F16H 57/02; B25B 13/481; B25B 13/461; B25B 21/02; B25B 17/02; B25B 17/00
USPC ......................................................... 81/57.3
See application file for complete search history.

(56) References Cited

U.S. PATENT DOCUMENTS

| 189,352 | A | * | 4/1877 | Fox .......................... B25B 17/00 |
| | | | | 81/57.3 |
| 641,782 | A | * | 1/1900 | Kostlan ................... B25B 17/00 |
| | | | | 81/57.3 |
| 2,121,406 | A | | 6/1938 | Panabaker |
| 2,482,387 | A | | 9/1949 | Veneman |
| 2,630,731 | A | | 3/1953 | Imboden |
| 2,769,360 | A | * | 11/1956 | Cottrell ................... B25B 13/04 |
| | | | | 81/124.3 |
| 3,477,318 | A | | 11/1969 | Batten |
| 3,675,516 | A | * | 7/1972 | Knudsen ............... B25B 13/065 |
| | | | | 81/124.6 |
| 4,277,990 | A | | 7/1981 | Hall |
| 4,366,731 | A | | 1/1983 | Vallevand |
| 4,374,479 | A | * | 2/1983 | Minotti ................... B25B 13/06 |
| | | | | 81/57.3 |

(Continued)

*Primary Examiner* — Hadi Shakeri

(74) *Attorney, Agent, or Firm* — Damian Wasserbauer, Esq.; Wasserbauer Law LLC

(57) ABSTRACT

The present invention is an improved offset torque drive assembly and system having useful application for torqueing a fastener in an opening offset from a channel or other fasteners in inaccessible locations. The offset torque drive assembly and system comprises a housing formed in upper and lower enclosure portions that encompasses an input gear and an output gear there-between. The housing is characterized by a plurality of pin mounts connecting to a plurality of pins maintaining the input and output gears in the housing with sufficient space to operate in the drive assembly. The pins may be secured to the pin mounts by welding, adhesive and by a unitary, sealed housing formed with said pins providing spacing for operation of the gears.

5 Claims, 5 Drawing Sheets

(56) References Cited

U.S. PATENT DOCUMENTS

| | | | |
|---|---|---|---|
| 4,374,480 A * | 2/1983 | Diaz | B25B 13/481 |
| | | | 74/421 R |
| 4,649,776 A * | 3/1987 | Puncochar | B25B 13/481 |
| | | | 74/433 |
| 4,825,729 A | 5/1989 | Puncochar | |
| 5,179,876 A * | 1/1993 | Gadea Mantilla | B25B 17/02 |
| | | | 81/57.14 |
| 5,226,906 A * | 7/1993 | Crombie | A61B 17/8875 |
| | | | 606/104 |
| 5,339,710 A | 8/1994 | Deadmond | |
| 5,522,285 A * | 6/1996 | Wilson, Jr. | B25B 13/48 |
| | | | 81/57.14 |
| 5,595,095 A | 1/1997 | Hillinger et al. | |
| 5,595,251 A | 1/1997 | Cook | |
| 6,945,139 B1 * | 9/2005 | Johnson | B25B 13/481 |
| | | | 81/177.2 |
| 7,454,997 B2 | 11/2008 | Putney et al. | |
| 7,703,356 B2 * | 4/2010 | Bass | B25B 13/481 |
| | | | 81/177.8 |
| 7,721,627 B2 * | 5/2010 | Basham | B25C 7/00 |
| | | | 81/57.14 |
| 8,065,806 B2 | 11/2011 | Rainone et al. | |
| 8,065,936 B2 * | 11/2011 | Tutino | B25B 17/02 |
| | | | 81/57 |
| 2006/0107798 A1 | 5/2006 | Falzone | |
| 2008/0229887 A1 | 9/2008 | Thompson et al. | |
| 2008/0245193 A1 * | 10/2008 | Lipka | B25B 13/107 |
| | | | 81/58.2 |
| 2009/0084230 A1 | 4/2009 | Selgas | |
| 2013/0025416 A1 | 1/2013 | Dedrickson et al. | |

\* cited by examiner

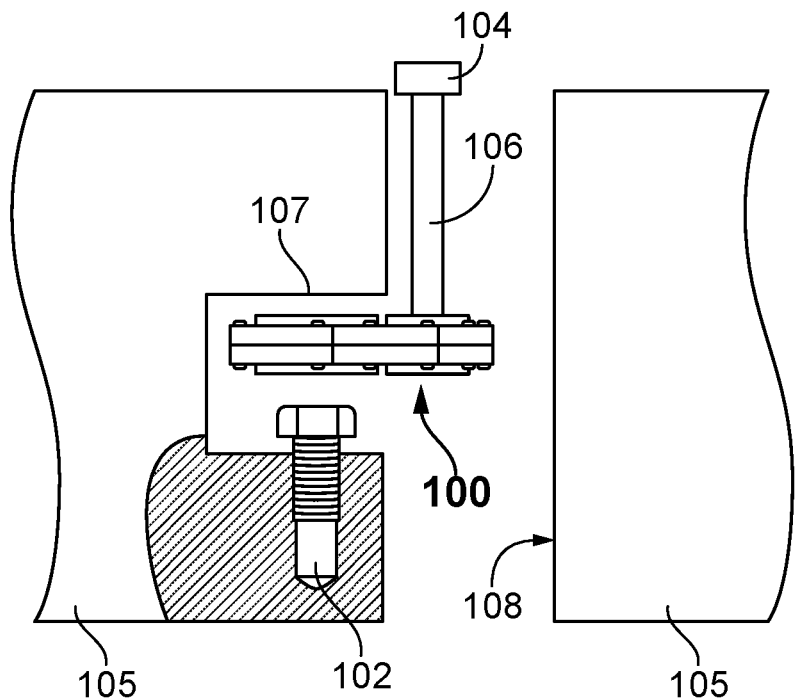
FIG. 3
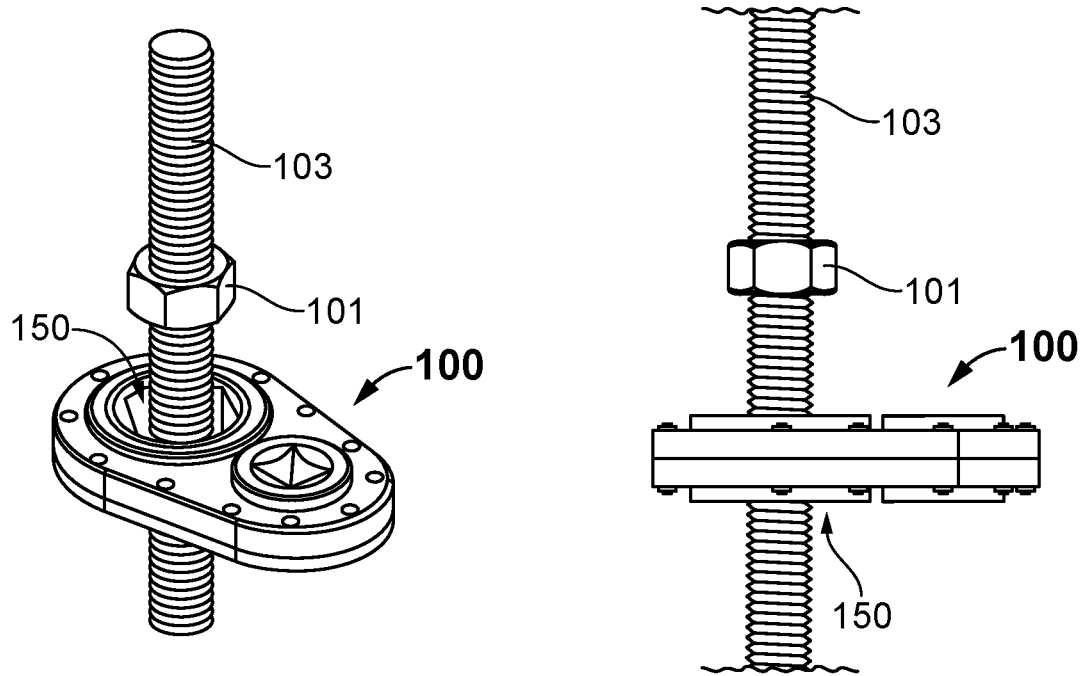
FIG. 4A
FIG. 4B

OFFSET TORQUE DRIVE APPARATUS AND SYSTEM

CROSS-REFERENCE TO RELATED APPLICATION

This application claims the benefit of U.S. Provisional Application No. 62/202,834, filed Aug. 8, 2015 entitled "OFFSET TORQUE DRIVE APPARATUS AND SYSTEM," which is incorporated in its entirety.

FIELD OF THE INVENTION

This invention relates generally to torque wrenches, and more particularly to an improved offset drive capable of accurately torqueing a fastener in an opening offset from a channel or other fasteners in inaccessible locations.

BACKGROUND OF THE INVENTION

Conventional torque wrenches have a handle and drive head to apply torque directly to the part to be operated on such as, for example, a nut, bolt or other fastener with unique head attachment designs. In such conventional torque wrenches the gear transfer system is located in the drive head making it necessary to locate the drive head adjacent the part to be operated on, which can be impractical if the part is located in an opening offering restricted access to the wrench such as, for example, not practical to use because of lack of clearance or in openings offset from a channel in inaccessible locations. It is frequently very difficult for the conventional torque wrench to be directly connected to a particular part in closely confined areas. For example, the automotive industry is utilizing more and more complex fasteners that require drive devices for installation (i.e. tightening and loosening) as well as increasingly such fasteners are used to secure parts and accessories in finished products located in locations inaccessible to a conventional torque wrench (e.g. engine compartments, interiors, and in openings located adjacent channels). As a result, there is a need for an improved offset drive capable of accurately torqueing a fastener in an opening offset from a channel, fasteners in inaccessible locations, and a fastener in difficult confined areas.

Conventional drive extensions are elongated with multiple gears designed to attach to conventional torque wrenches, drills or other powered drives are adapted to be directly connected to a particular part where the extension is capable of transferring torque to the place required. It is frequently very difficult for the conventional drive extensions torque to be directly connected to a particular part in closely confined areas and in openings located adjacent channels. As a result there is a need for an offset gear drive extension for torqueing a fastener in an opening lacking clearance or in openings offset from a channel in inaccessible locations.

Conventional drives and extensions currently do not address problems in threading fasteners (e.g. nuts, spacers) on elongated threaded rods fixed in an object, which involves time-consuming assembly and ratcheting of the nut. It is common in modern construction to embed and set threaded rods in concrete for creating platforms or hangers for cabling, trays, ductwork and the like. For example, multiple parallel elongated threaded rods may be set in a concrete ceiling for a hanger system for cabling. Assembly thereof involves joining a bracket between two adjacent parallel threaded rods at a predetermined height and threading nuts supporting the bracket to establish the predetermined height (e.g. nine feet (9')). This is repeated between adjacent parallel threaded rods to create a cabling channel supported from the ceiling at the predetermined height. Conventional and wrenches slip off of the nut and two hands may be often required to maintain positive connection with the fastener while threading up the elongated rod. As a result, there is a need for an assembly and system to efficiently and effectively torque a fastener along lengths of an elongated threaded rod.

As a result there is a need for an offset gear drive socket assembly and system of a compact design for torqueing a fastener in an opening offset from a channel, fasteners in inaccessible locations, and a fastener in difficult confined areas.

SUMMARY OF THE INVENTION

It is an object of the present invention to provide an offset torque drive apparatus, system and method, comprising: an input gear having a concentric ring base portion defining an inner surface with a tool adapter portion and an outer surface with a plurality of gear teeth, an output gear operably connected to the input gear that has a concentric ring defining an inner surface with a socket fastener aperture and an outer surface with a plurality of gear teeth for interfacing with the cares of the input care. The input gear and output gear are shielded from environmental factors in a housing comprising an upper enclosure portion and a lower enclosure portion, each having an opening for the input gear and for the output gear adapted to be joined by a plurality of support pins configured to be received and aligned relationship with a plurality of pin mounts formed in the upper and lower enclosure portions of the housing. The housing further includes a bearing recess adapted to receive and locate a bearing adjacent each of the input gear and output gear and bearing recess in the upper and lower enclosure portions thereof. The input gear is operably connected to the input gear in manner whereby the torqueing of the input gear by a drive shaft in the tool adapter portion by a drive means engages the output gear with a fastener located in the socket adapter portion. Consequently, the compact offset torque drive is configured to accurately torque to a fastener in an opening offset from a channel, fasteners in inaccessible locations, and a fastener in difficult confined areas.

It is an object of the present invention to provide an offset drive apparatus system and method with a cupped-socket portion configured to efficiently and effectively torque a fastener along lengths of an elongated threaded rod.

It is a further object of the present invention to provide an offset drive apparatus system and method with an output gear with splines to receive a spline insert functioning to provide the user with the ability to connect to numerous variations of fastener heads and shapes allowing the offset torque drive to accurately torque to a fastener in an opening offset from a channel, fasteners in inaccessible locations, and a fastener in difficult confined areas as well as to easily change to a cupped-socket portion configured to efficiently and effectively torque a fastener along lengths of an elongated threaded rod

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Description of the Embodiments, which is to be read in association with the accompanying drawings, which are incorporated in and constitute a part of this specification, show certain aspects of the subject matter disclosed herein and, together with the description, help explain some of the principles associated with the disclosed implementations, wherein:

FIG. 3 is a schematic, partial cut-away side view of the offset drive assembly in use accordance to an embodiment of the present invention;

FIGS. 4A and 4B are schematic views illustrating another embodiment of the present invention where FIG. 4A is a perspective view illustrating the offset drive assembly in use turning a nut on a threaded rod; and FIG. 4B is a side view illustrating the offset drive assembly in use turning a nut on a threaded rod;

FIG. 7A illustrates the system offset drive assembly configured for a socket insert; FIG. 7B illustrates the socket insert of the present invention.

DESCRIPTION OF THE EMBODIMENTS

Figure 1:
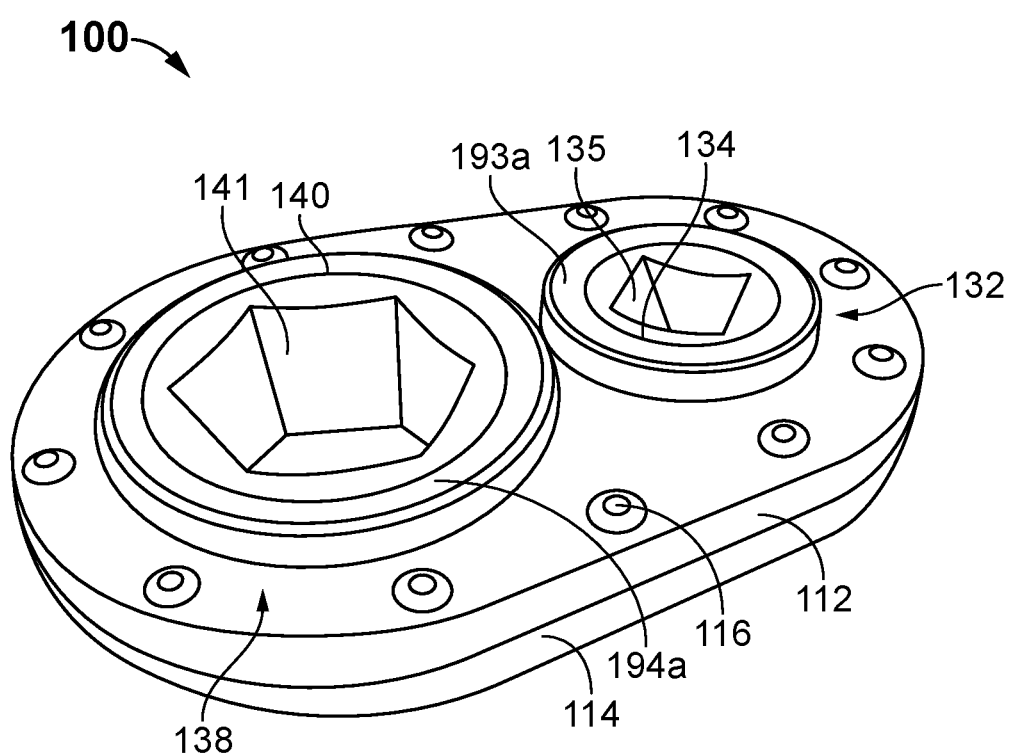
FIG. 1 is a perspective view illustrating the offset drive assembly and system in accordance with an embodiment of the present invention.

Non-limiting embodiments of the present invention will be described below with reference to the accompanying drawings, wherein like reference numerals represent like elements throughout. While the invention has been described in detail with respect to the preferred embodiments thereof, it will be appreciated that upon reading and understanding of the foregoing, certain variations to the preferred embodiments will become apparent, which variations are nonetheless within the spirit and scope of the invention.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "some embodiments", "one embodiment", "certain embodiments", and "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

The drawings featured in the figures are provided for the purposes of illustrating some embodiments of the present invention, and are not to be considered as limitation thereto. Term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein and use of the term "means" is not intended to be limiting.

The term "adapted" or "adapted to" preceding a present participle of an operation indicates the concept of configured to fit, being capable of, or suited by nature, character, or designed to a particular use, purpose, or situation, or adjustment or modification of the methods, assembly or system for which there is one or more embodiments, i.e., one or more methods, devices, or apparatuses for achieving the desired function and that one skilled in the art could select from these or their equivalent in view of the disclosure herein and use of the term "adapted" is not intended to be limiting.

As used herein the term "bearing" refers to a surface upon which the gears interface including the input and output gears a bearing ring, a bearing surface, a strip of bearing material, a support bearing, a bearing element, member or means. According to an embodiment of the present invention, the upper and lower surfaces of a gear are adapted to move along a bearing surface within a cavity formed in the housing so as to reduce frictional force and improve sliding, slippage forces in response to rotational motion and contact of the gear.

As used herein the term "gear" refers to a part, as a ring, disk or wheel having cut teeth of such form, size, and spacing that they mesh with teeth in another part, e.g. a ring, disk or wheel having cut teeth of such form, size, and spacing to transmit or receive force and motion, and to permit to run in either direction. A "gear ratio" is the measurement of the relationship of the arrangement of these gear parts for affording different relations of torque and speed between the driving gear and output gear connected to mechanism, e.g. the fastener.

As used herein the term "hex", "hexagon" "hexagonal" refers to a polygon having six angles and six sides.

As used herein the term "insert" refers to a part to placed, put or introduced into the body of something, introduce or cause to be introduced into the body of something.

As used herein the term "offset" refers to mechanisms having parallel axis or axes and being offset from each other including mechanisms that are laterally offset from the centerline, e.g. to project as an offset or branch.

As used herein the term "pin" refers to a metal rod positioned through holes in adjacent parts to keep the parts together.

As used herein the term "ratchet" refers to a device in which a toothed rack or wheel is engaged by a pawl to permit motion in one direction only.

As used herein the term "recess" refers to a cavity or depression in an object, item, body, part, or structure.

As used herein the term "torque," "torqueing," or "torque drive" refers to producing torsion or rotation, or otherwise the moment of a force or system of forces tending to cause rotation.

As used herein the term "securing" refers to welding, joining, attaching, affixing As used herein the term "socket" refers to a flexible and resilient socket shell, socket cavity, meeting socket connector, socket portion, non-circular socket, socket member, stem receiving socket, a closed-end socket, or capped bottom socket. The socket fastener aperture may be scalable to include standard, e.g. SAE and metric, and non-standard fastener shapes and sizes which is a non-limiting dimension, for example, the socket fastener aperture be formed in fastener socket size of ¼, ⅜ ½, ⅝, ¾, ⅞, 1" and metric socket sizes of 2 mm, 3 mm, 4 mm, 5, mm, 6 mm, 7 mm, 8 mm, 30 mm. Similarly the tool adapter portion may be scalable to include standard, e.g. SAE and metric, and non-standard drive shaft sizes that may include a ball bearing and spring type interconnection whereby such drive socket sizes are a non-limiting dimension, for example, tool adapter portion be formed in drive shaft socket size dimensions of ¼", ⅜" and ½".

As used herein the term "spacer" refers to a stand-off between parts and things.

As used herein the term "spline" refers to a series of uniformly spaced ridges on a shaft, parallel to its axis and fitting inside the hub of a gear, etc., to transmit torque. Such splines may further operably connect corresponding grooves or splines in an insert or other part. As used herein the term "spline drive" refers to a part or operation of the splines transmit torque to a part, item, thing or another object such as corresponding grooves or splines in an insert or other part.

As used herein the term "wrench" refers to a tool for gripping and turning or twisting the head of a bolt, a nut, a pipe, or the like, commonly consisting of a bar of metal with fixed or adjustable jaws.

Figure 2:
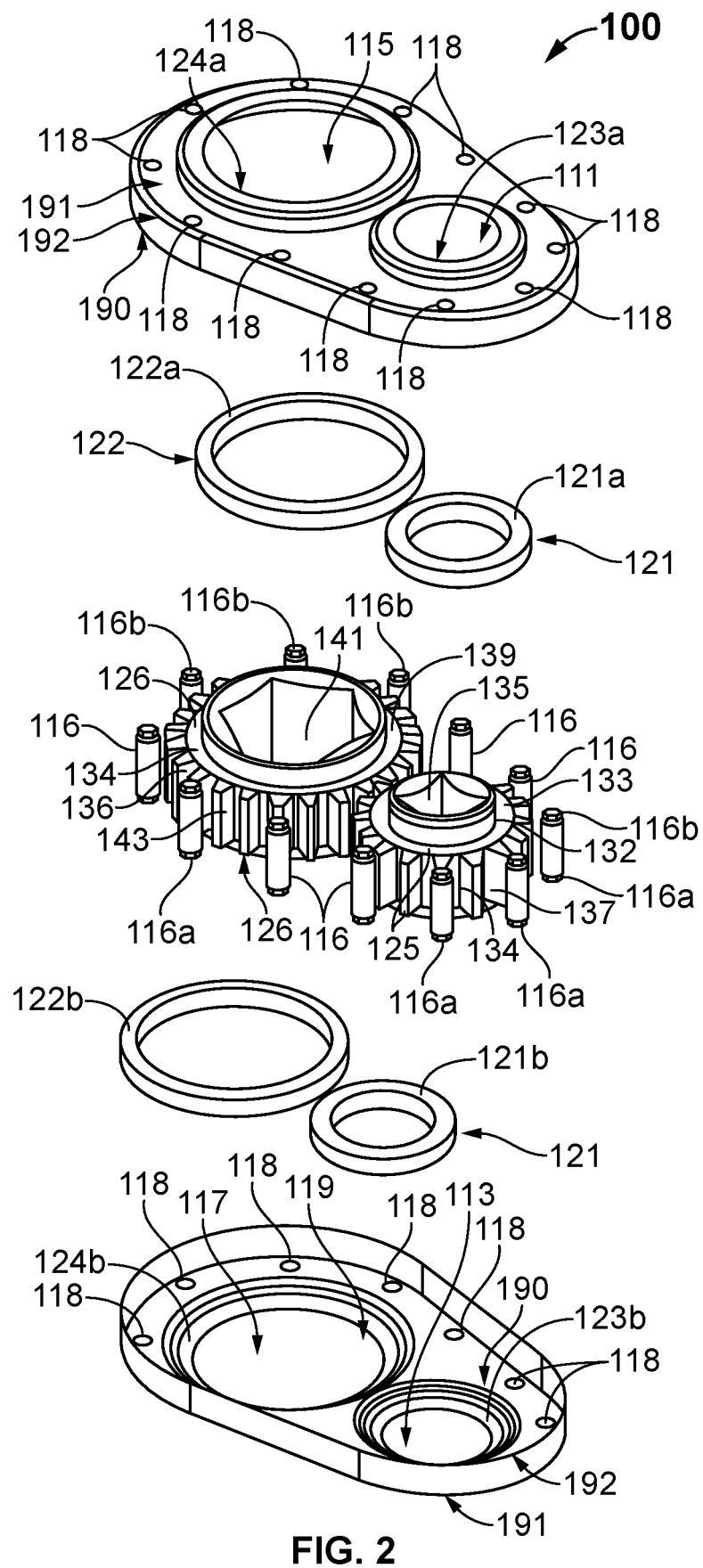
FIG. 2 is an exploded perspective view illustrating the offset drive and system of the present invention.
Figure 5:
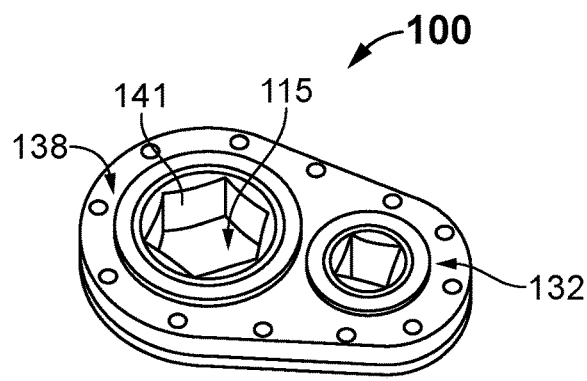
FIG. 5 is a perspective view illustrating the offset drive assembly and system with a hexagonal socket.

Referring to FIGS. 1 and 2, the offset drive assembly and system is generally referred to as element 100. According to an embodiment of the present invention, the offset drive assembly 100 is described to tighten and/or loosen a fastener 102 by a drive 104 applying a rotational force through a drive shaft 106, as is illustrated in FIG. 1. In another embodiment, the offset drive assembly 100 is described the offset drive assembly in use turning a nut 101 on a threaded rod 103, as is illustrated in FIGS. 4A and 4B. While the present invention is described in these embodiments, other uses will be apparent to one skilled in the art whereby the present invention should be should not be limited to these exemplary embodiments used to describe the advantages and features of the present invention.

Referring to FIG. 2, the offset drive assembly 100 comprises a housing 110 configured in an upper enclosure portion 112 and a lower enclosure portion 114 adapted to enclose a gear assembly 120 spaced apart by a plurality of support pins 116. The upper and lower enclosure portions 112, 114 are configured with a bearing recess 119 and generally formed of a shape of minimum dimensions and sufficient to enclose the gear assembly 120. The housing 110 includes an inner portion 190, an external portion 191, and a side portion 192. The housing 110 further includes a plurality of openings formed in the upper enclosure portion 112 and, similarly, formed in the lower enclosure portion 114. For example, the upper enclosure portion 112 is configured with an opening 111 of suitable dimensions for the input gear 132 and an opening 115 of suitable dimensions for the output gear 138. Similarly, the lower enclosure portion 114 is configured with an opening 113 of suitable dimensions liar the input gear 132 and an opening 117 of suitable dimensions for the output gear 138. The housing 110 may be held in spaced apart relationship by a plurality of pins 116 that are configured to be received in pin mounts 118 formed in the housing 110 such as, for example, the plurality of support pins 116 may be received in openings formed in the upper and lower enclosure portions 112, 114, respectively, and affixed, welded or otherwise secured therein. A first pin end 116a of pin 116 may be received in pin mounts 118 of the upper enclosure portion 112. Similarly, a second pin end 116h of pin 116 may be received in pin mounts 118 of the lower enclosure portion 114. Each pin end may be characterized by a narrowed portion having a different diameter than the diameter of the pin extending therebetween, i.e., pin 116. Furthermore, the diameter of the first pin end 116a and the diameter of the diameter of the second pin end 116b are substantially smaller, so that either end may be received within pin mounts 118. The lengthwise dimension may be formed of sufficient length to allow for the pin 116 to be affixed to the upper and lower enclosure portions. The housing 110 may further be configured with a hearing recess 119 formed in the upper enclosure portion 112 and the lower enclosure portion 114 that is located adjacent each of the openings 111, 113, 115 and 117.

Referring to FIGS. 1-6, 7A-7B, the upper and lower enclosure portions 112, 114, respectively, are configured to provide sufficient space for the gear assembly 130 to operate via a drive 104 upon a fastener 102. The space relationship is maintained by the plurality of spacer pins 116 and these pins 116 are utilized to provide structure to the housing 110. For example, the plurality of pins 116 provide and support the upper enclosure portion 112 in a spaced apart relationship with the lower enclosure portion 114 functioning so as not to have the upper or lower enclosure portions 112, 114 impede the operation of the input gear 132, the output gear 138, or the overall operation of the gear assembly 130 and the offset drive assembly and system 100. The ring bearings 121 and 122 associated with the gear assembly 130 also maintain the spaced apart relationship and function to reduce friction of the gears in rotational operation. The bearings 121, 122 may be formed as a combined bearing and seal 127 and made from suitable material functioning to reduce friction and to prevent external contaminants from entering the sealed housing 110 when torqueing a fastener in an opening offset from a channel, fasteners in inaccessible locations, and a fastener in difficult confined areas. The housing 110 may be scalable in size and dimension and it should be appreciated is a non-limiting dimension, for example, the housing is formed compact in an opening offset from a channel or other fasteners in inaccessible locations, as shown in FIG. 3, or dimensioned larger based on the socket fastener adapter portion such as, for example, sized for the cupped-fastener aperture 150 efficiently and effectively torque a fastener along lengths of an elongated threaded rod. Similarly, the housing 110 may be scalable, as appropriate, as the spline drive system 160 utilizes the components of the offset torque drive assembly 100 and modifies the socket fastener aperture 141 with a spline drive 170 formed on the inner surface 140 of the concentric ring 139 of the output gear 138 to receive the insert socket 180 that may be scalable to include standard, e.g. SAE and metric, and non-standard fastener shapes and sizes which is a non-limiting dimension, for example, the socket fastener aperture be formed in fastener socket size of ¼, ⅜ ½, ⅝, ¾, ⅞, 1" and metric socket sizes of 2 mm, 3 mm, 4 mm, 5, mm, 6 mm, 7 mm, 8 mm, 30 mm. Similarly the tool adapter portion may be scalable to include standard, e.g. SAE and metric, and non-standard drive shaft sizes that may include a ball bearing and spring type interconnection whereby such drive socket sizes are a non-limiting dimension, for example, tool adapter portion be formed in drive shaft socket size dimensions of ¼", ⅜" and ½".

Referring to FIG. 2, the gear assembly 130 is configured with a suitable gear ratio 131 sufficient to provide torque to rotate the fastener 102, thereby tightening and loosening the fastener 102 as desired. The gear assembly 130 comprises an input gear 132 and an output gear 138. The input gear 132 may be configured from a generally concentrically ring 133 having an inner surface 134 with a tool adapter portion 135 dimensioned in a shape to accept and join to the shaft 106 of the drive 104 so as to impart rotational force to the input gear 132 by the drive 104. The input gear 132 further may be configured with an outer surface 136 having a plurality of gear teeth 137 arranged concentrically around outer surface 136. The tool adapter portion 135 may be scalable to include standard, e.g. SAE and metric, and non-standard drive shaft sizes that may include a ball bearing and spring type interconnection whereby such drive socket sizes are a non-limiting dimension, for example, tool adapter portion be formed in drive shaft socket size dimensions of ¼", ⅜" and ½".

Similarly, output gear 138 may be configured from a generally concentrically ring 139 generally of a larger dimension that the input gear ring 133 based on the desired gear ratio 131. The output gear 138 is configured with an inner surface 140 dimensioned in a socket fastener aperture 141 to join the operative surface of the fastener 102 so as to tighten and/or loosen drive 104 to impart rotational force thereto. The output gear 138 also may be configured with an outer surface 142 having a plurality of gear teeth 143 arranged concentrically around outer surface 142 of a suitable dimension to interface with the gear teeth 137 disposed on the outer surface 136 of the input gear 132 thereby operably connecting the gear teeth 137, 143 when imparting rotational force thereto.

In operation, the input gear 132, also sometimes referred to as a drive gear, is configured to convert torque applied thereto to the larger output gear 138 so as to move (e.g. tightening or loosening) the fastener 102. The drive 104 provides power and torque input through a shaft 106 inserted in a tool adapter portion 135. The input gear 132 and output gear 138 are operably connected by rotation of the input gear 132 whereby gear teeth 137 operably coupled to the gear teeth 143 cause the output gear 138 to rotate forwardly (e.g. clockwise) and apply torque to the fastener 102. The rotation of the input gear 132 will be opposite the rotation of the output gear 138, whereby a desired rotation of the fastener is achieved the input to the drive shaft 106 so that the output gear 138 rotates in the desired direction. For example, the input gear 132 and output gear 138 are operably connected by rotation of the input gear 132 whereby gear teeth 137 cause the output gear 138 to rotate rearward (e.g. counterclockwise) to apply torque to the fastener 102 by the rotational torque provided by the drive 104 applied through the drive shaft 106 in the opposite direction, as shown in orientation illustrated in FIGS. 3 and 4. In this manner, the fastener 102 may be tightened or loosened depending on the rotational force and/or torque applied through the drive shaft 106 to the assembly 100. It is also appreciated by one skilled in the art that different gear ratios 131 will vary the force and torque ultimately applied to the fastener 102 by increasing or decreasing the gear ratio 131 between the input gear 132 and the output gear 138.

Referring to FIG. 2, a bearing 121 may be formed to be received and seated on a bearing surface 125 of the input drive gear 132. Similarly, a bearing 122 may be received and seated on a bearing surface 126 of the output drive gear 138. For example, to ring bearings 121, designated as ring bearing 121a and 121b for ease of illustration, are configured to be received and seated on an upper and lower bearing surface 125 on either side of the input gear 132. When the upper enclosure portion 112 and lower enclosure portion 114 is closed upon the gear assembly 130, the ring bearing 121a is received in the bearing recess 123a in the upper enclosure portion 112 providing access to the tool adapter portion 135 through the opening 111. Similarly, the ring bearing 121b is received in the bearing recess 123b in the lower enclosure portion 114 providing access to the tool adapter portion 135 through the opening 113 on the reverse side of the offset drive assembly 100. Additionally, the ring bearing 122a is received in the bearing recess 124a providing access to the socket adapter portion 141 through the opening 115 in the upper enclosure portion 112. Similarly, the ring bearing 122b is received in the bearing recess 124b in the lower enclosure portion 114 providing access to the tool adapter portion 141 through the opening 117 in the lower enclosure portion, e.g. on the reverse side of the offset drive assembly 100. As shown with reference to FIGS. 2, 3, and 4A-4B, bearing recesses 123a and 124a protrude outward from the external portion 191 of upper enclosure portion 112. Similarly, bearing recesses 123b and 124b protrude outward from the external portion 191 of lower enclosure portion 114. The bearings 121 and 122 provide support to the associated with the gear assembly 130 reducing friction of the input and output gears 132, 138 during rotational operation as well as maintain the spaced apart relationship of the upper and lower enclosure portions 112, 114 of the housing 110. The bearings 121, 122 may be formed as a combined bearing and seal 127 and made from suitable material functioning to reduce friction and to prevent external contaminants from entering the sealed housing 110 when torqueing a fastener in an opening offset from a channel, fasteners in inaccessible locations, and a fastener in difficult confined areas.

The plurality of pins 116 providing support between the upper enclosure portion 112 and lower enclosure portion 114 as well as housing the input gear 132 and the output gear 138. The plurality of pins 116 is received in the corresponding pin mount 118 aligned between the upper enclosure portion 112 and lower enclosure portion 114, as is shown in FIG. 2. The plurality of pins 116 may be joined in the pin mount 118 of the upper enclosure portion 112 and lower enclosure portion 114 by welding, adhesive, and other securing means. The plurality of pins 116 may be made from suitable materials such as, for example, metals, hardened steel, plastic, carbon fiber, nylon, and other suitable materials of sufficient strength and durability functioning to provide support between the two halves of the upper and lower enclosure portions 112, 114 of the housing 110 as well as to function to support the input gear 132 and the output gear 138 between the associated bearings 121, 122.

The housing 110 may be made from suitable materials such as, for example, metals, hardened steel, plastic, carbon fiber, nylon, and other suitable materials of sufficient strength and durability functioning to the gears and aligned fashion during rotation, to provide sufficient strength so that upon torqueing the input and output gears 132, 138, respectively that the housing 110 maintains structural integrity. The housing 110 may also be formed by computer numeric controlled (CNC) manufacturing, injection molding or other manufacturing techniques. Alternatively, according to another embodiment of the present invention, the housing 110 may be formed as one unit through manufacturing techniques that would eliminate the upper enclosure portion and lower enclosure portion combining these into an integral, sealed one-piece housing 110.

According to an embodiment of the present invention, for example, the gear assembly 130 includes the input gear 132 and output gear 138, as is shown in FIGS. 1 and 2. The input gear 132 is generally formed to torque the output gear 138 according to a desired gear ratio 131. The input gear 132 comprises a ring 133, of a generally concentric shape, having an inner surface 134 with a tool adapter portion 135 and an outer surface 136 with a plurality of gear teeth 137 formed thereon. The input gear 132 further comprises a bearing surface 125 located on the ring 133, on an upper and lower portion adapted to receive the bearing 121a and 121b, respectively, as is illustrated in FIG. 2. Similarly the output gear 138 comprises a ring 139, of a generally concentric shape, having an inner surface 140 with a socket fastener aperture 141 and an outer surface 142 with a plurality of gear teeth 143 formed thereon. The socket fastener aperture may be scalable to include standard, e.g. SAE and metric, and non-standard socket sizes and should be appreciated is a non-limiting dimension, for example, the socket fastener adapter be formed in socket dimensions of ¼, ⅜ ½, ⅝, ¾, ⅞, 1" and metric socket sizes of 2 mm, 3 mm, 4 mm, 5 mm, 6 mm, 7 mm, 8 mm, 30 mm. The output gear 138 further comprises a bearing surface 126 located on the ring 139, on an upper and lower portion adapted to receive the bearing 122a and 122b thereon, respectively, as is illustrated in FIG. 2. Each of the input and output gears 132, 138, respectively, may be formed from suitable materials such as, for example, metals, hardened steel, plastic, carbon fiber, nylon, and other suitable materials of sufficient strength and durability functioning to the gears.

Figure 6:
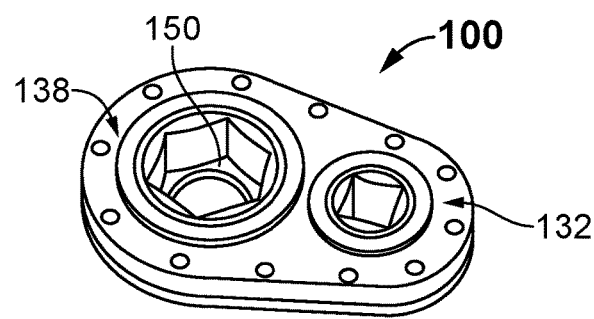
FIG. 6 is a perspective view illustrating the offset drive assembly and system with a closed base hexagonal socket.

In an alternative embodiment of the present invention, as is illustrated in FIGS. 5, 6 and 7A-7B, the offset torque drive assembly 100 may be configured with a thru (through) hex-drive socket fastener aperture 141, a closed-end, or capped-bottom hex-drive socket fastener aperture 150, and a spline drive system 160 each providing the advantages of the present invention. It should be appreciated that the socket fastener aperture 141 may be made in any desired shape to cooperate with the fastener 102, for example, square, Philips-head, hexagon, star, and other fastener shapes without departing from the spirit and scope of the invention. For example, the thru hex-drive socket fastener aperture 141 may be utilized in applications and functions of a confined space, as shown in FIG. 3, and in applications of quickly moving a nut 101 along a threaded rod 103 as is shown in FIGS. 4A and 4B, whereby the offset torque drive assembly 100 may be formed with a socket fastener aperture 141 configured with a cupped-bottom socket or cupped-bottom fastener aperture 150, as shown in FIG. 6, that may be utilized in applications and functions of quickly moving a nut 101 along a threaded rod 103 when a positive engagement feel is desired, and other applications that will be apparent to the user.

According to an embodiment of the present invention, as is illustrated in FIG. 3, the offset torque drive assembly 100 has an application in confined spaces. Offset torque drive assembly 100 advantageously provides access to a fastener 102 secured an object 105 that is located in an opening 107 adjacent a channel 108 of the object 105. The fastener 102 may be accessed by the user placing the shaft 106 into the tool adapter portion 135, moving the offset drive assembly 100 in the channel 108 to the location of the opening 107 remaining attached to the shaft 106, rotating the shaft 106 to locate the socket fastener aperture 141 adjacent and then secured around the fastener 102, and then the user uses the drive 104 (i.e. the other end of the shaft 106 may be inserted into a chuck of the drive, ratchet, impact gun, drill, or other drive means) to turn the input gear 132 thereby driving the output gear 137 and turning fastener 102. The offset torque drive assembly 100 advantageously allows a user too quickly and easily access bolts, nuts, etc. that typically would not be able to be accessed without other removing other parts, or using inferior tools and methods perform the same task.

According to another embodiment of the present invention, the offset torque drive assembly 100 has an application in the construction industry to quickly run a nut 101 on a threaded rod 103 for hangers and the like. Conventional drives and extensions currently do not address problems in threading fasteners (e.g. nuts, spacers, brackets, platforms) on elongated threaded rods fixed in an object, which involves time-consuming assembly and ratcheting of the nut. For example, a hanger system for information technology (IT) cabling sets multiple parallel elongated threaded rods in a concrete ceiling for creating platforms or hangers for cabling, trays, ductwork and the like. The assembly of the hanger system involves joining a bracket between two adjacent parallel threaded rods at a predetermined height and threading nuts supporting the bracket to establish the predetermined height (e.g. nine feet (9')), and repeating for example at additional predetermined heights (e.g. 8', 7', etc.). Establishing the platform base by securing the bracket with nut at predetermined heights is repeated between adjacent parallel threaded rods to create a cabling channel supported from the ceiling at the established predetermined height. Conventional sockets are not configured to slide along an elongated length as the drive socket blocks passage through of the threaded rod. Additionally, wrenches slip off of the nut and two hands may be often required to maintain positive connection with the fastener while threading up the elongated rod. As a result, there is a need for an assembly and system to efficiently and effectively torque a fastener along lengths of an elongated threaded rod, which is currently performed by hand and has these assembly and time-consumption problems.

As a result, the time required to move the nut 101 on a threaded rod 103 can be reduced and improved, as is illustrated in FIGS. 4A-4B and 6, whereby a user locating the offset torque and drive assembly 100 on the threaded rod 103, inserting the shaft 106 of a drive 104 in the tool adapter portion 135 (i.e. the other end of the shaft 106 may be inserted into a chuck of the drive, ratchet, impact gun, drill, or other drive means), locating the cupped-fastener aperture 150 (socket fastener aperture 141) around the nut 101, and then energizing the drive 104 (e.g. a drill, ratchet, impact gun, drill, or other drive means), as shown in FIG. 3. In this manner, the drive 104 transfers torque power into the input gear 132 so as to turn the output gear 138 rotating the nut 101, which is supported in positive engagement by the cupped-fastener aperture 150, thereby threading or otherwise moving the nut 101 upwardly, or downwardly by the rotational force applied by the drive 104 through the drive shaft 104 to the offset torque drive assembly 100 as desired, on the threaded rod 103 quickly and efficiently. In accomplishing this purpose, the offset torque drive assembly 100 has a small, compact design that is easily transportable and used at the location of the construction to perform a multitude of tasks and different purpose in multiple fields of use advantageously making the offset torque drive assembly more versatile than conventional extensions and drive designs as well as overcoming the inherent problems thereof.

Figure 7A:
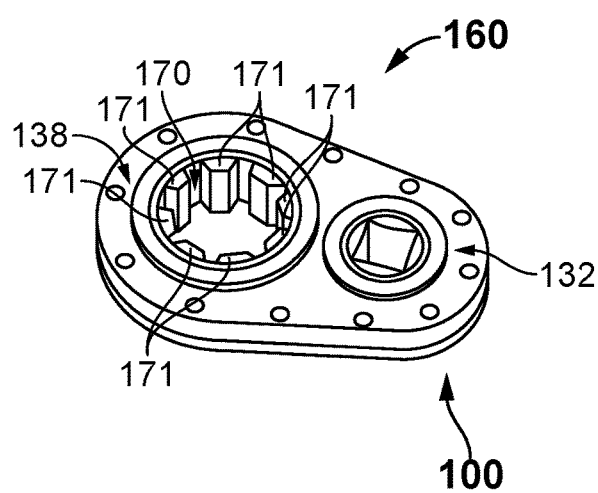
FIGS. 7A and 7B are perspective views illustrating the offset drive assembly and system for interchangeable sockets whereby
Figure 7B:
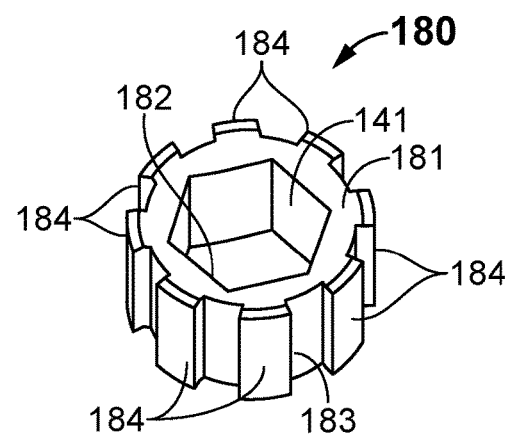
Figure 8:
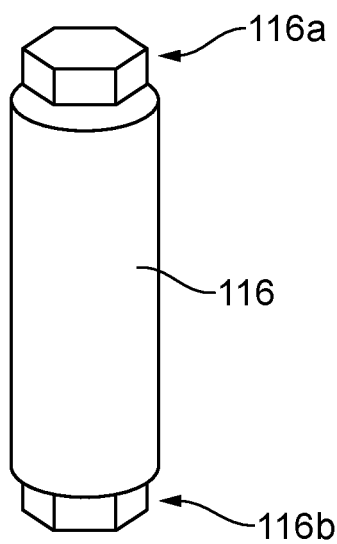
Figure 9:
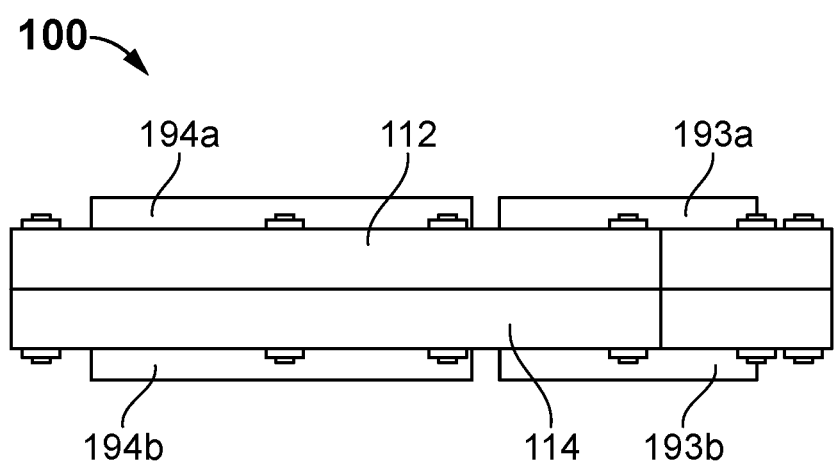

As is illustrated in FIGS. 7A-7B, the offset torque drive assembly 100 may be configured as a spline drive system 160. The spline drive system 160 utilizes the components of the offset torque drive assembly 100 and modifies the socket fastener aperture 141 with a spline drive 170 formed on the inner surface 140 of the concentric ring 139 of the output gear 138. One or more splines 171 may be formed in the inner surface 140 of the concentric ring 139 support of the output gear 138, as shown in FIG. 7A. As shown in FIG. 7B, a spline insert 180 comprises a concentric ring 181 having an inner surface 182 with a socket fastener aperture 141 and an outer surface 183 with a plurality of insert splines 184. The spline drive 170 is configured to receive slidably the spline insert 180 therein. The spline drive 170 and the splines 184 of the spline insert 180 are slidably received by the splines 171 of the spline drive 170 may further be magnetized so as to securely join when the spline insert 180 is slidably received by the drive 170. The spline insert 170 may be formed as the cupped-bottom fastener aperture 150 so that the spline drive 170 may operate and function to efficiently and effectively torque a fastener along lengths of an elongated threaded rod. Advantageously, the spline insert 180 may be formed in numerous designs and sold as a kit in order to provide the user with multiple options and may be formed in any desired shape to cooperate with the fastener 102, for example, square, Philips-head, hexagon, star, and other fastener shapes without departing from the spirit and scope of the invention. Advantageously, the offset torque drive system 100 has an output gear 138 with splines 171 to receive a spline insert 180 functioning to provide the user with the ability to connect to numerous variations of fastener heads and shapes allowing the offset torque drive 100 to accurately torque to a fastener 102 in an opening 107 offset from a channel 108, fasteners in inaccessible locations, and a fastener in difficult confined areas as well as to easily change to a cupped-socket fastener portion 150 configured to efficiently and effectively torque a nut 101 or other types of fasteners along lengths of an elongated threaded rod 103

While certain configurations of structures have been illustrated for the purposes of presenting the basic structures of the present invention, one of ordinary skill in the art will appreciate that other variations are possible which would still fall within the scope of the appended claims. Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An offset torque drive assembly for receiving a drive shaft of a drive, comprising:
a gear assembly comprising two gears, wherein the gear assembly includes:
an input gear including an input concentric ring having an inner surface having a tool adapter portion and an outer surface with a plurality of gear teeth, said tool adapter portion including a drive socket configured to receive an end of a drive assembly external from said offset torque drive assembly;
an output gear for operably connecting to said input gear, said output gear including an output concentric ring having an inner surface with a socket fastener aperture integral to said output gear and an outer surface with a plurality of gear teeth; and
a housing comprising an upper enclosure portion and a lower enclosure portion, each of said upper and lower enclosure portions having an unobstructed inner portion, an external portion, and side portions, each of said upper and lower portions having an opening for said input gear and an opening for said output gear, each of said upper and lower enclosure portions configured with a plurality of pin mounts configured to receive a plurality of support spacer pins in aligned relation thereof, wherein each support spacer pin comprises a non-threaded shaft, a first pin end and a second pin end and wherein each pin end comprises a diameter that is smaller than the diameter of the non-threaded shaft;
said upper and lower enclosure portions each having a bearing recess protruding from said external portion, adapted to receive a bearing correspondingly sized for said input gear or said output gear of said gear assembly such that when said housing is assembled, said upper and lower enclosure portions, spaced apart by said plurality of support spacer pins minimally conform to said gear assembly,
said offset torque drive assembly characterized by said plurality of support spacer pins being operably attached to said plurality of pin mounts by welding, affixing or adhesively securing said pin ends to said plurality of pin mounts, respectively, so as to couple said upper enclosure portion in a spaced apart relationship with said lower enclosure portion having said plurality of support spacer pins being disposed in the inner portions of said housing with said input gear and said output gear freely operating within said housing.

2. The assembly of claim 1, wherein said socket fastener aperture is configured with a cupped-bottom fastener adapter selected from a group consisting of a SAE, metric and/or a non-standard fastener shape for operably connecting to said cupped-bottom fastener adapter.

3. The assembly of claim 1, wherein said socket fastener aperture being configured with a spline insert having said output concentric ring configured with a plurality of splines on said inner surface of said output gear.

4. The assembly of claim 3, wherein said spline insert comprises a cupped-bottom fastener aperture functioning to torque a fastener along lengths of an elongated threaded rod.

5. The assembly of claim 1, wherein said socket fastener aperture being magnetized so as to operably connect to a spline insert.

* * * * *